Jan. 20, 1931.   H. A. KIESELBACH   1,789,706
STEAM TRAP
Filed Aug. 8, 1928
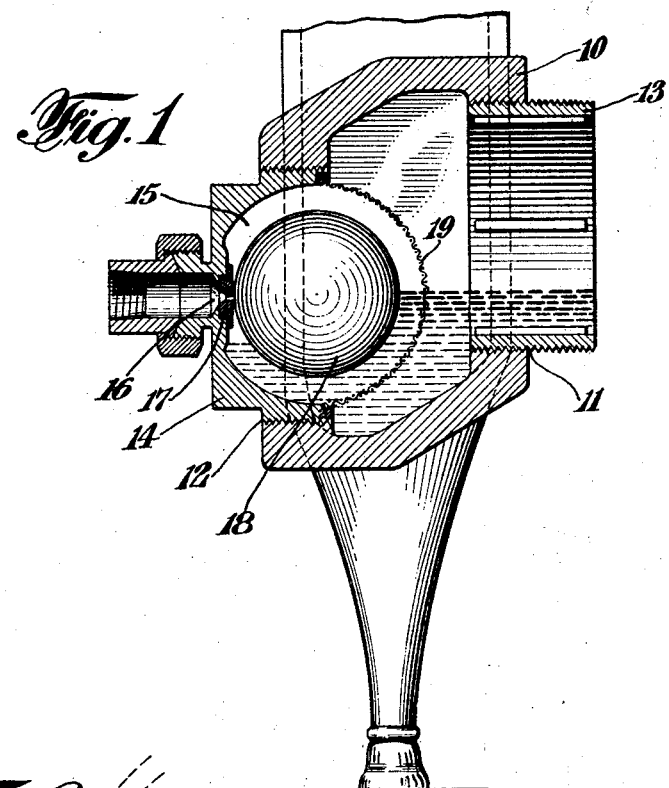
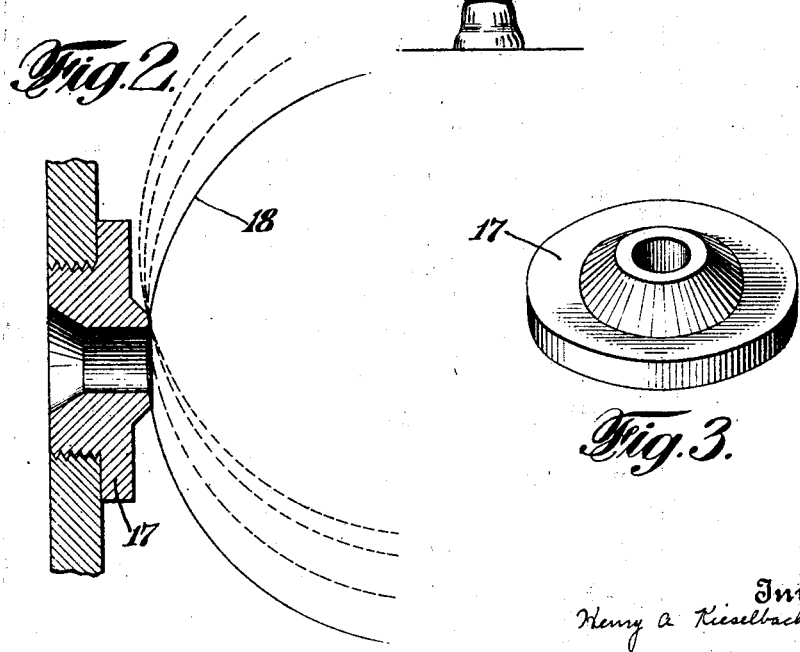
Inventor
Henry A. Kieselbach
By his Attorneys Kenyon & Kenyon Patented Jan. 20, 1931

1,789,706

UNITED STATES PATENT OFFICE

HENRY A. KIESELBACH, OF MONTCLAIR, NEW JERSEY

STEAM TRAP

Application filed August 8, 1928. Serial No. 298,247.

This invention relates to steam traps and more especially to steam traps of the general type disclosed in the patent to C. S. Brown, No. 1,153,316, issued December 7, 1915. In this type of steam trap the outlet valve for air and water comprises a ball cooperating with a nozzle having a flat vertical end surface over which the ball moves vertically to open and close the orifice in the nozzle.

One object of this invention is to increase the extent of opening between the ball and the orifice upon a given increase of depth of water in the trap.

This object is attained by making the end of the nozzle frusto-conical. The ball after a limited upward vertical movement pivots around the edge of the nozzle as a fulcrum and for the same amount of vertical lift opens a wider space between itself and the end of the orifice in the nozzle than is obtainable by a straight upward lift. This arrangement increases the capacity of the trap to handle air and water and also results in a longer life for the nozzle. The latter condition is due to the fact that the frusto-conical shape of the nozzle causes deflection of water around the narrow flat surface at the end of the nozzle so that there is practically no wear thereon and an increased nozzle life is the result.

Other objects, novel features and advantages of this invention will be apparent from the following specifications and accompanying drawings wherein Fig. 1 is a vertical section through a trap applied to a steam radiator and embodying the invention;

Fig. 2 is an enlarged diagrammatic view and

Fig. 3 is an enlarged perspective view of the nozzle.

The trap comprises a casing 10, having threaded apertures 11 and 12 in opposite walls. 13 is the inlet pipe from the radiator to the trap and is threaded into the aperture 11.

A plug 14 is threaded into the aperture 12 and is provided with a recess 15 from the center of which leads the outlet 16. A nozzle 17 is screwed into the plug 14 and constitutes the outlet orifice. The inner end of the nozzle is made frusto-conical as shown clearly in Fig. 3, so that there is provided only a narrow flat annular vertical surface at the end of the nozzle. A spherical float valve 18 is provided for closing the outlet orifice to prevent the escape of steam therethrough. The elevation of the orifice and the buoyancy of the ball 18 are such that the valve is lifted to open the orifice before the water level rises above the top of the orifice and returns to closing position before the water level drops below the bottom of the orifice. A screen 19 surrounds the ball 18 and prevents solid particles from reaching the outlet orifice.

The pressure exerted by the steam in the trap normally holds the ball 18 against the nozzle, thereby sealing the outlet orifice. However an increase of depth of water in the trap lifts the ball 18 and thus uncovers the outlet orifice in the nozzle thereby permitting the escape of water and air which, as is well known, underlie the steam in the casing. The valve closes the orifice before steam can escape. The ball 18 moves vertically upward over the narrow annual surface at the end of the nozzle and upon reaching the edge thereof it pivots around said edge as a fulcrum as shown in Fig. 2. After the ball has reached the edge of the nozzle, an additional lift thereof swings the ball around the edge and for a given upward movement opens a wider space between the ball and the orifice than is obtainable by a straight upward movement of the ball and thus permits a greater flow of water and air.

The capacity of the steam trap is increased by use of the frusto-conical nozzle and an additional advantage is gained in that the above described arrangement of nozzle effects a more rapid rise of the ball 18 and hence a quicker discharge and therefore a more positive and rapid discharge of air and water. When the ball is moved from orifice closing position and water flows toward the orifice there is a gradual fall in pressure from the maximum at some distance from the orifice to zero pressure just beyond the orifice. The frusto-conical nozzle provides a large space or channel of approach to the orifice. The velocity of the water is less and the fall in pressure more gradual or broadly speaking the water pressure at any given point is greater than with a nozzle having a flat vertical surface. This greater pressure resists the tendency of the ball to oscillate thereby making it steadier and the area of opening greater on the average.

Less erosion is effected by the water with the frusto-conical nozzle than with a nozzle having a wide flat surface surrounding the orifice. In the latter case the water passes over such surface in close contact therewith thus causing wear thereof. With the frusto-conical nozzle the sloping surface deflects the water around the narrow flat end surface so that very little if any water touches such surface. The wear is therefore greatly reduced and the nozzle-life is substantially increased.

It is of course apparent that various structural changes may be made in the device above described without in any way departing from the spirit of the invention as defined in the appended claim.

I claim:

A steam trap having provision for permitting the escape of both air and water, said trap comprising a casing, a bushing threaded in the wall of said casing, said bushing being provided with a frusto-conical projection and having a horizontal outlet channel extending therethrough, a freely floating ball for closing said outlet channel, said ball being of such buoyancy and the outlet channel being of such elevation that when the ball closes said channel the water level lies below the upper edge of said outlet channel, said projection terminating in a narrow flat vertical annular face whereby pivotal movement of the ball is effected after slight elevation from its closing position.

In testimony whereof, I have signed my name to this specification.

HENRY A. KIESELBACH.

CERTIFICATE OF CORRECTION.

Patent No. 1,789,706.  Granted January 20, 1931, to

HENRY A. KIESELBACH.

It is hereby certified that error appears in the printed specification of the above numbered patent requiring correction as follows: Page 1, line 1, after the word "traps" insert the words having provision for permitting the escape of both water and air; same page, line 76, for the word "annual" read annular; and that the said Letters Patent should be read with these corrections therein that the same may conform to the record of the case in the Patent Office.

Signed and sealed this 21st day of April, A. D. 1931.

(Seal)

M. J. Moore,
Acting Commissioner of Patents.